(12) United States Patent
Mills (10) Patent No.: US 6,359,893 B1
(45) Date of Patent: *Mar. 19, 2002

(54) MULTI-RATE SWITCHING DEVICE FOR A MIXED COMMUNICATION RATE ETHERNET REPEATER

(75) Inventor: Andrew Mills, Coto de Caza, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/363,784

(22) Filed: Jul. 29, 1999

Related U.S. Application Data (63) Continuation of application No. 08/901,112, filed on Jul. 28, 1997, now Pat. No. 5,991,303.

(51) Int. Cl.⁷ ............................................. H04L 12/413
(52) U.S. Cl. ...................... 370/402; 370/463; 370/465
(58) Field of Search ................................. 370/463, 402, 370/445, 425, 315, 465, 466

(56) References Cited

U.S. PATENT DOCUMENTS

| | | | |
|---|---|---|---|
| 5,541,957 A | * 7/1996 | Lau | 375/258 |
| 5,596,575 A | 1/1997 | Yang et al. | |
| 5,671,249 A | 9/1997 | Andersson et al. | |
| 5,754,540 A | 5/1998 | Liu et al. | |
| 5,754,552 A | 5/1998 | Allmond et al. | |
| 5,771,237 A | 6/1998 | Kao | |
| 5,883,894 A | * 3/1999 | Patel et al. | 370/438 |
| 5,896,417 A | 4/1999 | Lau | |
| 5,922,052 A | * 7/1999 | Heaton | 709/223 |
| 5,991,303 A | * 11/1999 | Mills | 370/402 |
| 6,148,002 A | * 11/2000 | Patel et al. | 370/438 |
| 6,154,464 A | * 11/2000 | Feuerstraeter et al. | 370/463 |

* cited by examiner

*Primary Examiner*—Min Jung
(74) *Attorney, Agent, or Firm*—Lyon & Lyon LLP (57) ABSTRACT

A multi-communication rate switching physical device for a port of a mixed communication rate Ethernet repeater network. The present invention includes a physical device for recovering bits from a wire connection (e.g., fiber, twisted pair, etc.) that is coupled to computer system adapter. The physical device can be implemented on a single chip integrated within an Ethernet repeater hub within each hub port. The physical device chip of the invention includes a front end multiplexer coupled to channel information between a 10 Base T physical device circuit and a 100 Base T physical device circuit, depending on the result of an auto-negotiation circuit also on the physical device chip. The physical device chip also advantageously employs a second, back end multiplexer, that is coupled to channel data between either the 10 Base T physical device circuit or the 100 Base T physical device circuit and one of a multiple of media independent interfaces (MIIs). The back end multiplexer is controlled by a combination of signals including the auto-negotiation circuit result and a system management interface override signal. By providing multiple MII (or giga MII) interface connections, the invention provides a low cost solution to allow the associated port to be automatically associated with a number of different collision domains within the Ethernet network. Port assignment to one domain or another is flexible and can be based on: (1) the result of an auto-negotiation session; (2) a manual override; or (3) detected errors in the fastest attempted rate.

28 Claims, 10 Drawing Sheets

MULTI-RATE SWITCHING DEVICE FOR A MIXED COMMUNICATION RATE ETHERNET REPEATER

Cross-Reference to Related Applications

This application is a continuation of application Ser. No. 08/901,112, filed Jul. 28, 1997 now U.S. Pat. No. 5,991,303, for A MULTI-RATE SWITCHING PHYSICAL DEVICE FOR A MIXED COMMUNICATION RATE ETHERNET REPEATER.

BACKGROUND OF THE INVENTION

1. Field of the Invention

The present invention relates to the field of local area networks (LANs) using the Ethernet communication protocol (e.g., the IEEE 802.3 Standard). Specifically, the present invention relates to a switchable component within a network repeater hub.

2. Description of Related Art

Figure 1:
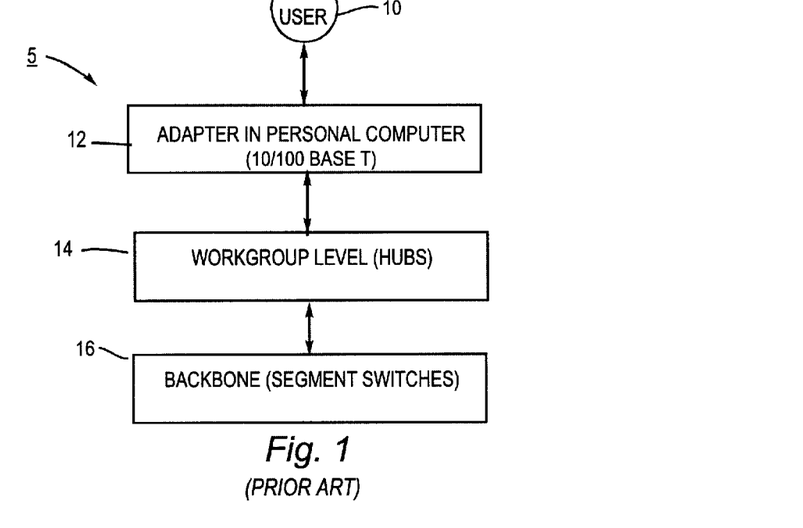
FIG. 1 is a prior art diagram of three levels of an Ethernet communication network including one level at the adapter of a computer system, a second workgroup level including repeater hubs and a third backbone level including segment switches.

Communication networks for computer systems are an extremely popular form of providing network computing today. FIG. 1 illustrates a high level block diagram of the communication levels within a typical communication network system 5. System 5 has a first communication level 12 including communication adapters ("cards") that are inserted into computer systems to provide them with networking capability. The computer systems interface with users 10. The second communication level 14 is the workgroup level and includes hubs (e.g., repeater hubs, switching hubs, etc.). The hubs provide communication pathways between computer systems of the same or multiple local area networks (LANs). Computer systems coupled to a common hub share the same collision domain. A collision domain is a group of computer systems logically connected to share the same physical bandwidth (e.g. 10 Megabits/sec or 100 Megabits/sec) of a communication pathway. In the field of twisted pair cable repeater hubs, a collision domain is managed by a Repeater Interface Controller (RIC). The third level 16 is often called the backbone or backplane level and can include segment switches. Among other functions, the components of level 16 provide communication pathways between hubs and between different collision domains.

Recently, 100 Megabit bandwidth networking (100 M or 100) has been introduced into the marketplace of computer network systems from an installed base of 10 Megabit bandwidth systems (10 M or 10). This has led to the development of dual rate adapter cards (e.g., of level 12) that can be configured to communicate at 100 M or 10 M; these dual rate adapters are referred to as 10/100 adapters. The IEEE 802.3 standard provides for an auto-negotiation session whereby the 10/100 adapter can determine which communication rate is supported by its coupled hub (e.g., of level 14). However, as described in more detail below, many of the workgroup hubs in level 14 do not support 100 M networking because of the additional cost required to upgrade the workgroup equipment to this rate.

Figure 2A:
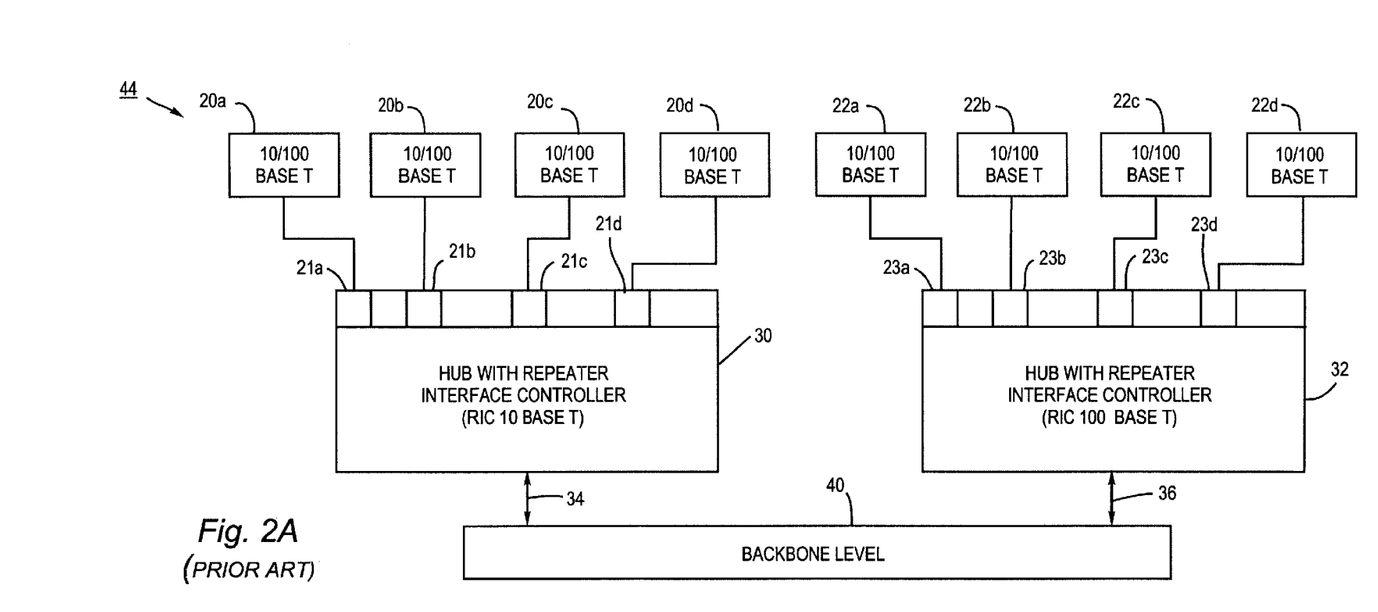
FIG. 2A is a prior art network design having multiple repeater hubs coupled to a backbone circuit.

For instance, refer to FIG. 2A which illustrates a prior art communication system 44 employing two repeater hubs 30 and 32. Repeater hubs are low cost because they do not require an expensive Media Access Controller (MAC) for each port nor do they require switches; only a physical device (e.g., 21a–21d or 23a–23d) is required at each port to provide repeating. Within system 44, all ports of a repeater hub (the hub having one repeater interface controller, RIC) are required to be of the same communication rate because: (1) messages from one port are repeated to all other ports by the hub's RIC; and (2) because only one RIC is provided, only one collision domain is allowed. Therefore, 10/100 adapters 20a–20d are coupled to repeater hub 30 operating at 10 M while 10/100 adapters 22a–22d are coupled to repeater hub 32 operating at 100 M. The adapters 20a–20d and 22a–22d are coupled to their associated hubs through physical devices 21a–21d and 23a–23d, respectively. The repeater hubs 30 and 32 are coupled to backbone circuit 40 through pathways 34 and 36, respectively. Backbone circuit 40 may contain segment switches or routers. Due to the difference in operational speeds of hubs 30 and 32, the only means by which the two hubs can communicate is through backbone level 40, which has circuits that can adapt the data from each segment.

Figure 2B:
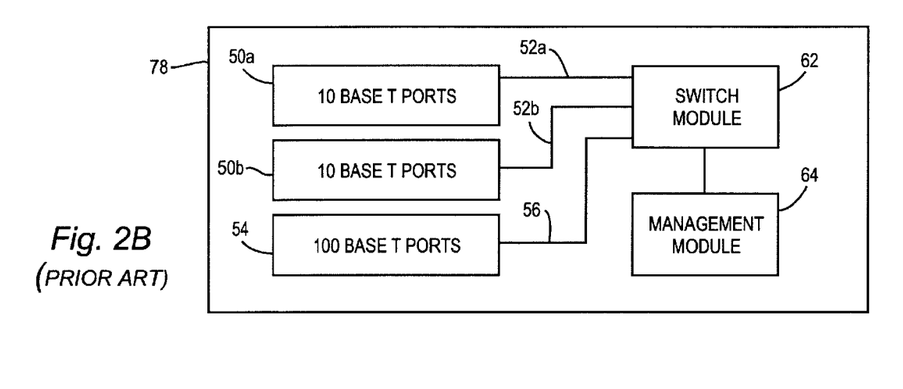
FIG. 2B is a prior art network similar to FIG. 2A but implemented with multi-port stackable repeater hubs.

FIG. 2B illustrates a similar prior art communication system 78 using three exemplary stackable low cost repeater hubs 50a, 50b and 54 that each use a single RIC. Hubs 50a and 50b operate at 10 M while hub 54 operates at 100 M. Hubs 50a and 50b are coupled to switch module 62 via separate pathways 52a and 52b, respectively, while hub 54 is coupled to switch module 62 via separate pathway 56. The switch module 62 provides communication between the different collision domain segments. This can be accomplished either using a bus based CPU architecture or a cross bar switch architecture. A management module 64 is also included and interfaces with the switch module 62.

In systems like system 44 and system 78 (FIGS. 2A and 2B), the majority of installed repeater hubs support only 10 M communication (e.g., 10 Base T). If one port of a 10 M repeater hub (e.g., hub 30 or a hub of hubs 50a and 50b) needs to be upgraded to 100 M, all ports within the 10 M repeater hub need to be upgraded because the hub only supports collision domain. This causes a problem because the cost of performing such an upgrade for all ports in a 10 M repeater hub is very expensive and can be impractical if only one port needs the 100 M communication rate. The prior art solution for providing 100 M communication has been to add repeaters, e.g., repeater hub 54, that handle only 100 M communication. However, this solution has drawbacks when a computer system moves from one port to another. For instance, if system 44 includes ten 10 M hubs like hub 30 and only one 100 M hub like hub 32 and then adapter 22a is moved from one building to another, adapter 22a may no longer be physically accessible to hub 32. The same is true for system 78. It would be advantageous to provide a low cost repeater hub design that offers the flexibility of readily upgrading one or more ports of the hub to 100 M while allowing the remainder ports to operate at 10 M without requiring expensive switching circuitry. The present invention provides such a repeater hub.

Figure 3:
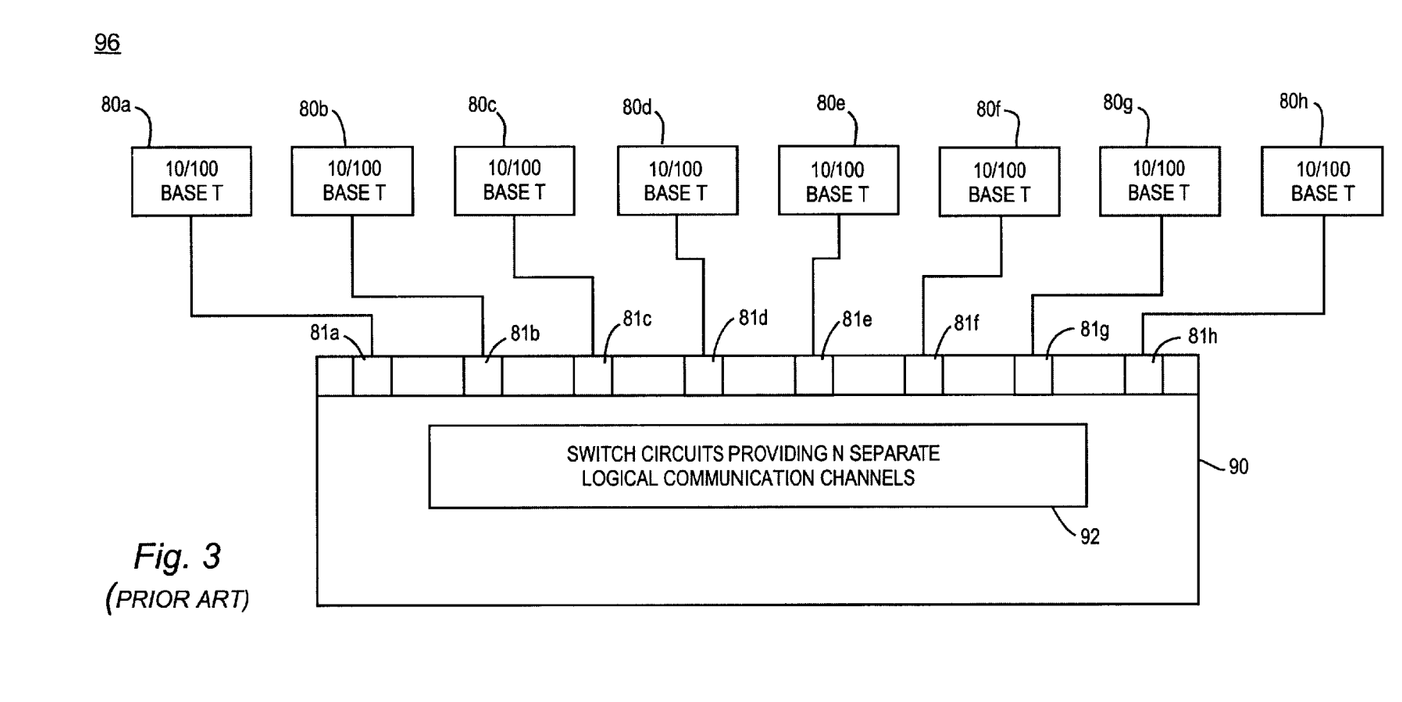
FIG. 3 is a prior art network design employing an expensive switch circuit to provide separate communication paths between coupled computer systems.

FIG. 3 illustrates a high cost communication network 96 based on a switching hub 90 that provides mixed 10 M and 100 M ports. Adapters 80a–80h of the 10/100 type are coupled via respective physical devices 81a–81h to switching hub 90. Switching hub 90 contains complex circuitry 92 to provide multiple independent communication channels between respective pairs of adapters 80a–80h. Switching hub 90 allows for mixed 10 M and 100 M ports because independent communication channels can be formed between adapter pairs. However, system 96 is a very expensive network solution due to the required switching logic. For instance, the cost per port of the switching hub 90 is well over an order of magnitude greater than the cost per port of repeater system 44 (FIG. 2A) or repeater system 78 (FIG. 2B). For many network applications, the use of switching hub 90 is not a practical solution for providing mixed 10 M and 100 M ports within a workgroup hub because of its high cost per port. It would be advantageous to provide a workgroup hub that offers the flexibility of mixed 10 M and 100 M ports while avoiding the high cost per port associated with switching hubs. The present invention provides such a repeater hub.

Figure 4:
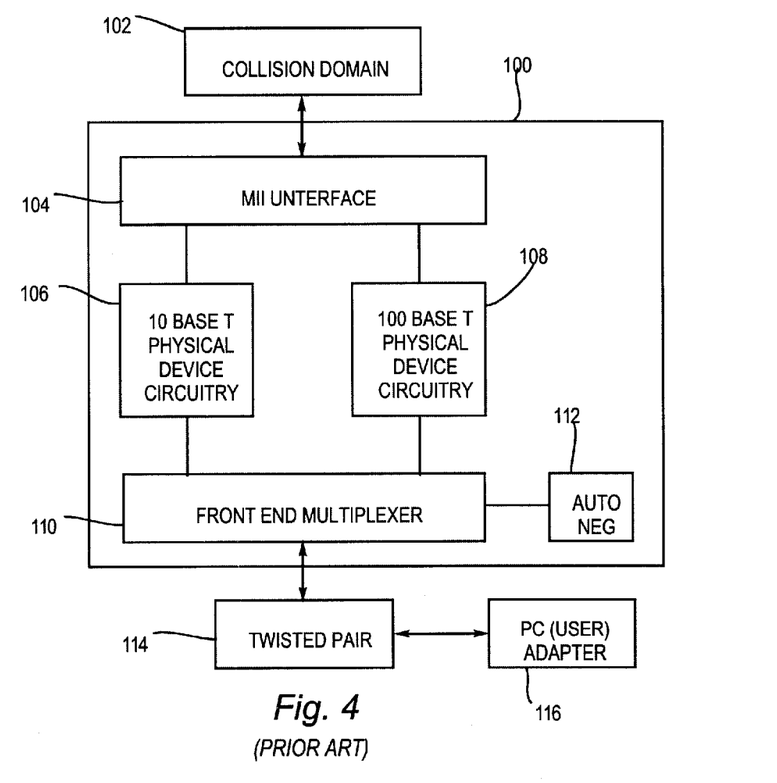
FIG. 4 is a prior art physical device circuit employing only one media independent interface (MII) connection for its associated port.

Lastly, some repeater hubs incorporate more than one RIC circuit allowing a mixture of both 10 M and 100 M ports within a single 10/100 repeater hub. However, these 10/100 repeater hubs, as well as the repeater hubs of system 44 and system 78, use prior art physical devices to recover information at the port connection. As shown in FIG. 4, the physical device circuits 100 of the prior art, while supporting either 10 Base T 106 or 100 Base T 108 communication, nevertheless offer only one media independent interface (MII) 104. Therefore, each port within the prior art 10/100 repeater hub (using physical device 100) is hardwired to communicate within one, and only one, collision domain 102 (e.g., 100 M domain or 10 M domain). While allowing mixed 10/100 port assignments, this prior art 10/100 repeater hub is not flexible with respect to changes in the computer system coupled to a particular port. For instance, if a particular port is operating at 100 M and the user for that port is replaced with another user that does not need 100 M, a significant amount of reconfiguration is required (e.g., by a system administrator or communication technician) to rewire the particular port into another collision domain or wire another user into the particular port. Alternatively, if the particular port is not rewired, then resource bandwidth becomes wasted as 100 M is being reserved for a possible 10 M use. It would be advantageous to provide a low cost 10/100 repeater hub that provides port-by-port flexible reconfiguration between multiple collision domains without requiring expensive switching circuitry. The present invention provides such a repeater hub.

In other implementations of the circuit of FIG. 4, separate circuitry is applied external to the physical device 100 and this external circuitry acts as a switch circuit between multiple segments. The switch circuitry is typically coupled to a serial management port and an external controller. However, such design also typically requires processor intervention for providing switching activity; again leading to a complex and expensive solution. It would be advantageous to provide a low cost 10/100 repeater hub that provides port-by-port flexible reconfiguration between multiple collision domains without requiring expensive switching circuitry external to the physical device for each port of the hub.

Accordingly, the present invention provides a low cost repeater hub that offers the flexibility of readily upgrading one or more ports of the hub to 100 M while allowing the remainder ports to operate at 10 M. The present invention provides workgroup repeater hub that offers the flexibility of mixed 10 M and 100 M ports while avoiding the high cost per port associated with switching hubs. The present invention provides a low cost 10/100 repeater hub with port-by-port flexible reconfiguration between multiple collision domains without external switching circuitry applied to the physical device. The present invention provides such a repeater hub with a novel switching physical device. These and other advantages of the present invention not specifically mentioned above will become clear within discussions of the present invention presented herein.

SUMMARY OF THE INVENTION

A multi-communication rate switching physical device is described herein for a port of a mixed communication rate Ethernet repeater network. When integrated within a 10/100 repeater hub of the present invention, the present invention provides a low cost solution allowing an installed based of 10/100 adapters to advantageously communicate at 100 M.

The present invention includes a physical device for recovering bits from a wire connection (e.g., fiber, twisted pair, etc.) that is coupled to an adapter of a computer system. The physical device can be implemented on a single chip integrated within an Ethernet repeater hub within each hub port. The physical device chip of the invention includes a front end multiplexer coupled to channel information between a 10 Base T physical device circuit and a 100 Base T physical device circuit, depending on the result of an auto-negotiation circuit also on the physical device chip. The physical device chip also advantageously employs a second, back end multiplexer, that is coupled to channel data between (1) either the 10 Base T physical device circuit or the 100 Base T physical device circuit and (2) one of a multiple of media independent interfaces (MIIs). The back end multiplexer is controlled by a combination of signals including the result of the auto-negotiation circuit and a system management interface override signal.

By providing multiple MII (or giga MII) interface connections, the invention provides a low cost solution allowing the associated port to be automatically associated with one of a number of different collision domains within the Ethernet network. Therefore, separate ports within a same repeater hub (or configuration of stackable repeater hubs) can be assigned to different collision domains without requiring expensive switching equipment. In one particular embodiment, the present invention provides an Ethernet 10/100 repeater hub allowing ports of one group of the 10/100 repeater hub to be assigned to a 100 Base T domain and ports of another group of the 10/100 repeater hub to be assigned to a 10 Base T domain. Port assignment to one domain or another is flexible and can be based on: (1) the result of an auto-negotiation session; (2) a manual override; or (3) detected errors in the fastest attempted rate. By allowing ports of a 10/100 repeater hub to be readily upgraded to 100 M communication, the present invention is a low cost solution allowing the installed based of 10/100 adapters to advantageously communicate at 100 M.

Specifically, embodiments of the present invention include a switchable physical device circuit integrated on a semiconductor substrate for interfacing with an adapter of a computer system, the switchable physical device circuit comprising: a first physical device circuit (e.g., Ethernet 10 Base T) operable at a first communication rate; a second physical device circuit (e.g., Ethernet 100 Base T) operable at a second communication rate; an auto-negotiation circuit for determining if the adapter is able to communicate at the second communication rate and generating a result signal indicative thereof; a front end multiplexer controlled by the result signal and for multiplexing information between the adapter and one of the first and the second physical device circuits; a first media independent interface circuit for communicating with a first collision domain; a second media independent interface circuit for communicating with a second collision domain; and a back end multiplexer controlled by the result signal and for multiplexing information between one of the first and the second physical device circuits and one of the first and the second media independent interface circuits. Embodiments of the present invention also include a repeater hub implemented with switchable physical devices as described above.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, and wherein.

DETAILED DESCRIPTION OF THE PREFERRED EMBODIMENTS

In the following detailed description of the present invention, a multicommunication rate switching physical device for a mixed communication rate Ethernet repeater, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Switching Physical Device with Two MI Connections

Figure 5:
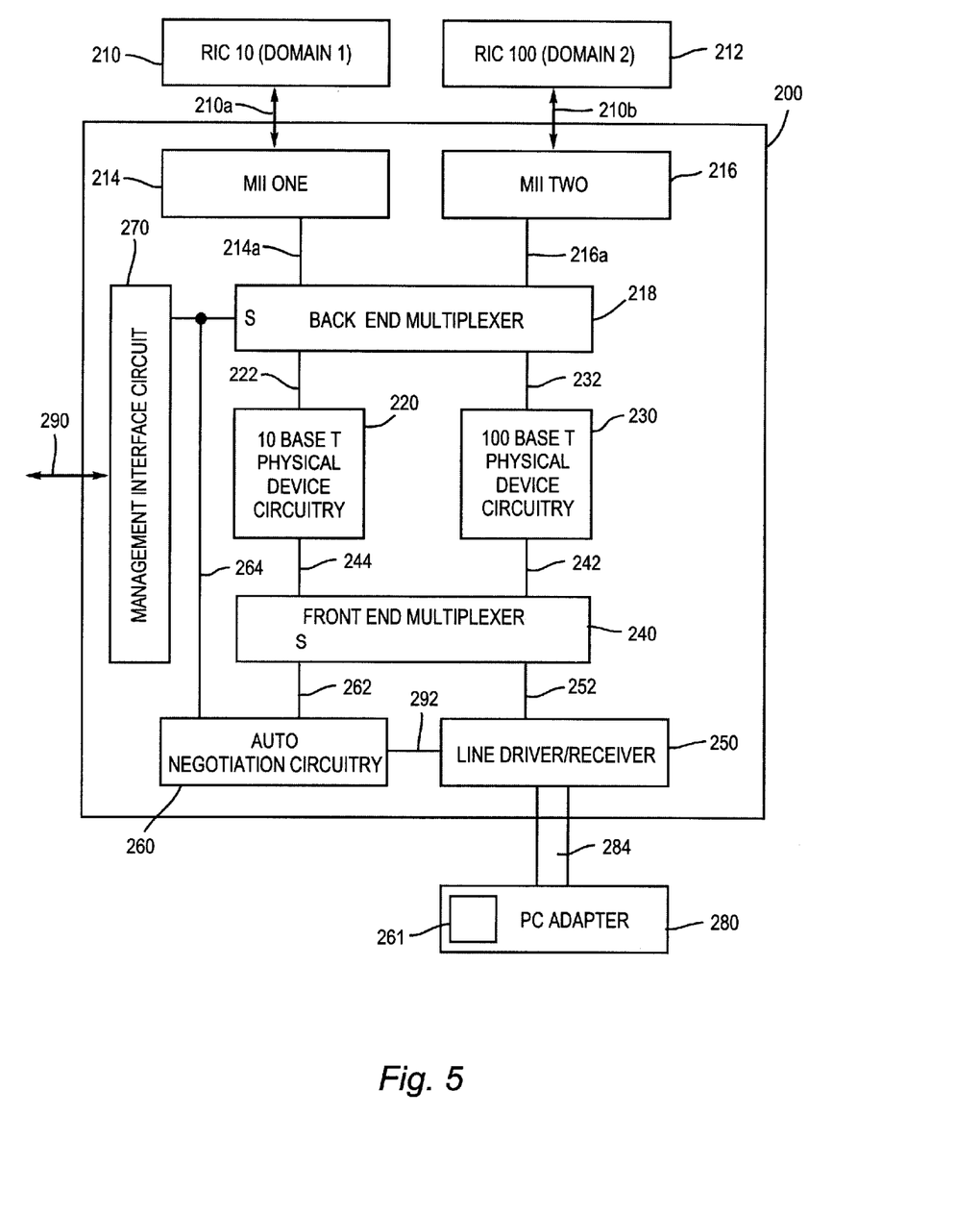
FIG. 5 is a switching physical device in accordance with the present invention including a controlled back end multiplexer for channeling information to one of multiple MII interface connections (e.g., two).

With reference to FIG. 5, a block diagram of the 10/100 physical device 200 ("physical device 200") in accordance with the present invention is shown. The physical device 200 is associated with each port of a repeater hub and is coupled to an adapter card 280 of an associated computer system (e.g., of the X86, Apple Macintosh, Sun, etc. design) via a twisted pair wire or fiber connection 284. The physical device 200 is used to recover bits of the signal information transmitted on connection 284. Once recovered by the physical device 200, the information can be repeated and forwarded to another port of a repeater hub or can be forwarded to higher level circuitry (e.g., a media access controller, MAC) that can construct a packet of information based on the recovered bits.

Physical device 200 is preferably implemented on a single semiconductor substrate (e.g., a "chip") and includes, at the front side, a line driver/receiver circuit 250 coupled to connection 284 (e.g., twisted pair wire). The line driver/receiver circuit 250 is coupled to communicate information with a front end multiplexer circuit 240. The select input of the front end multiplexer circuit 240 is controlled by a control signal in bus 262 generated by an auto-negotiation circuit 260. Auto-negotiation circuit 260 is coupled by bus 292 to the line driver/receiver circuit 250. The auto-negotiation circuit 260 is implemented in accordance with the IEEE 802.3 standard and a number of well known designs can be used. The front end multiplexer circuit 240 is coupled via bus 244 to a 10 Base T physical device circuit 220 and coupled via bus 242 to a 100 Base T physical device circuit 230. Front end multiplexer circuit 240 under control from the auto-negotiation circuit 260 multiplexes signals from bus 252 to either bus 244 or bus 242. Physical device 200 supports both 10 Base T and 100 Base T communication protocols.

In accordance with the present invention, physical device 200 of FIG. 5 includes a back end multiplexer 218 coupled by bus 222 to the 10 Base T physical device circuit 220 and coupled by bus 232 to the 100 Base T physical device circuit 230. Within physical device 200, well known circuits can be utilized for 10 Base T physical device circuit 220 and 100 Base T physical device circuit 230 which are described in more detail in FIG. 6A and FIG. 6B. The 100 Base T physical device can be implemented to support any of the IEEE 100 Base T standards, including 100 Base T2 and 100 Base TX for example. It is appreciated that physical device 200 can include more than two device circuits 220 and 230. For instance, a third physical device circuit can be used within physical device 200 that supports different types of either 10 Base T or 100 Base T communication, or, that supports 1000 Base T communication, etc. Physical device 200 advantageously includes more than one media independent interface (MII) allowing physical device 200 to be readily multiplexed between more than one collision domain.

Specifically, physical device 200 includes a first MII interface circuit (MII one) 214 and a second MII interface circuit (MII two) 216. It is appreciated that the giga media independent interface (GMII) can also be used to support 1000 Base-X/T standards. MII one circuit 214 is coupled to back end multiplexer 218 by bus 214a and MII two circuit 216 is coupled to back end multiplexer 218 by bus 216a. As shown by FIG. 5, MII one circuit 214 is for communicating with a first collision domain (domain 1) 210 and MII two circuit 216 is for communicating with a second collision domain (domain 2) 212. In one example, domain 1 210 is established by a 10 M repeater interface controller (RIC) and domain 2 212 is established by a 100 M IC. The RIC 10 M and the RIC 100 M can be integrated into a single 10/100 repeater of the present invention (see FIG. 10 for instance).

In accordance with the present invention, the select input of the back end multiplexer 218 is controlled by the control bus 264 that receives part of its signal from the result of the auto-negotiation circuit (e.g., the signal over bus 262) and part of its signal from a management interface circuit 270. The management interface circuit 270 provides a system management interface (SMI) including configuration override signals and receives control information from an SMI interface 290. Except as described differently herein, the management interface circuit 270 can be implemented using a number of well known designs.

In operation, when no override signal is present from SMI interface 290 physical device 200 operates as follows. The result of the auto-negotiation circuit 260 is used by the present invention to control both front end multiplexer 240 and back end multiplexer 218. Auto-negotiation is performed between the auto-negotiation circuit 260 and an analogous auto-negotiation circuit 261 within adapter 280 in accordance with the IEEE 802.3 standard. The result of auto-negotiation indicates whether adapter 280 supports 10 M or 100 M networking (or 1000 M if installed in physical device 200). If 100 M is supported, then a first control signal is generated by auto-negotiation circuit 260 to front end multiplexer 240 and to back end multiplexer 218 causing bus 252 to be coupled to bus 242 and further automatically causing bus 232 to be coupled to bus 216a. In this configuration, MII two 216 is used by physical device 200 and domain 2 212 is automatically selected. If 100 M is not supported, then a second control signal is generated by auto-negotiation circuit 260 to front end multiplexer 240 and to back end multiplexer 218 causing bus 252 to be coupled to bus 244 and further automatically causing bus 222 to be coupled to bus 214a. In this configuration, MII one 214 is used by physical device 200 and domain 1 210 is automatically selected.

The result of the auto-negotiation circuit 260 can be overridden by an external control (override) signal from external SMI 290. In operation, when the external override signal is present from SMI interface 290 physical device 200 ignores the result of the auto-negotiation circuit 260. The SMI 290 originates from a remote network management protocol which can force the physical device 200 to use 10 Base T physical device circuit 220 or force physical device 400 to use 100 Base T physical device circuit 230. In addition, the external control signal can force back end multiplexer 218 to select MII one 214 or force back end multiplexer 218 to select MII two 216. It is appreciated that when the external override signal is not present, multiplexers 240 and 218 are entirely controlled by the auto-negotiation circuit 260 thereby avoiding the need for complex external switching circuitry.

In accordance with the present invention, by providing multiple MII interfaces 214 and 216, the back end multiplexer 218 and the control signal originating from the auto-negotiation circuit 260, the present invention allows physical device 200 to automatically configure (or "switch") a single port to operate at a particular communication rate between multiple possible rates (e.g., 10 M or 100 M) and also to communicate within a particular collision domain between multiple possible domains that are all accessible to the port (e.g., domain 1 or domain 2). Furthermore, the switching functionality of the physical device can be controlled by auto-negotiation circuit 260 providing seamless switching between 100 M and 10 M domains without external switching circuitry.

Figure 6A:
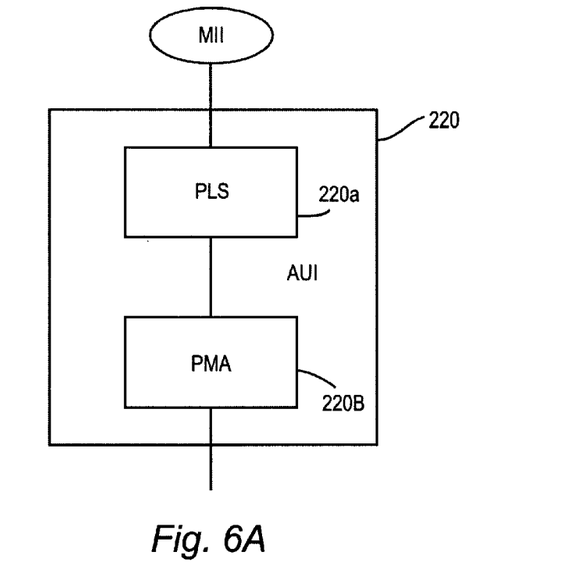
FIG. 6A is a block diagram of the 10 Base T communication circuitry of the physical device of the present invention.
Figure 6B:
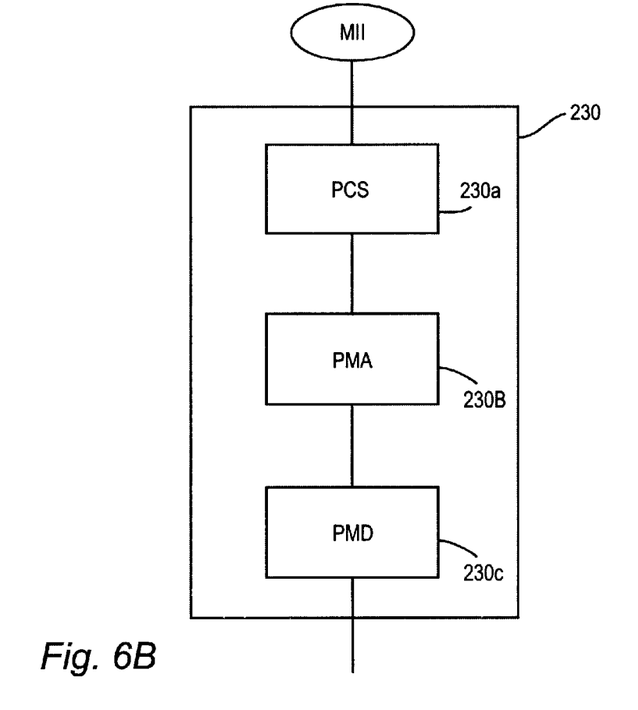
FIG. 6B is a block diagram of the 100 Base T communication circuitry of the physical device of the present invention.

FIG. 6A illustrates the details of the 10 Base T physical device circuit 220. and FIG. 6B illustrates the internal circuit blocks of 100 Base T physical device circuit 230. As discussed above, any of a number of well known circuit designs can be used to implement circuit 220 and the following discussion is exemplary only. The 10 Base T circuit 220 includes a PLS circuit 220a and a PMA circuit 220b. The PLS circuit is a physical layer signaling circuit and the PMA circuit is a physical medium attachment circuit. The AUI is an attachment unit interface and is optional. The 10 Base T circuit 220 performs the following functions: Manchester encoding/decoding; clock recovery; collision detection; line receiving and transmitting; filtering; wave shaping; squelch; jabber timing; link monitoring and automatic polarity correction.

The inner circuit blocks of 100 Base T physical device circuit 230 of FIG. 6B include a PCS circuit 230a that performs 4B/5B encoding and decoding, performs carrier detection, performs frame alignment, performs collision detection and performs serial to parallel conversion. Circuit PMA 230c performs required scrambling and descrambling operations as well as performs clock recovery. The PMD circuit 230c performs Mlt-3 operations, performs scrambling and descrambling, performs DC signal restoration and performs signal equalization.

Switching Physical Device with Four MII Connections

Figure 7:
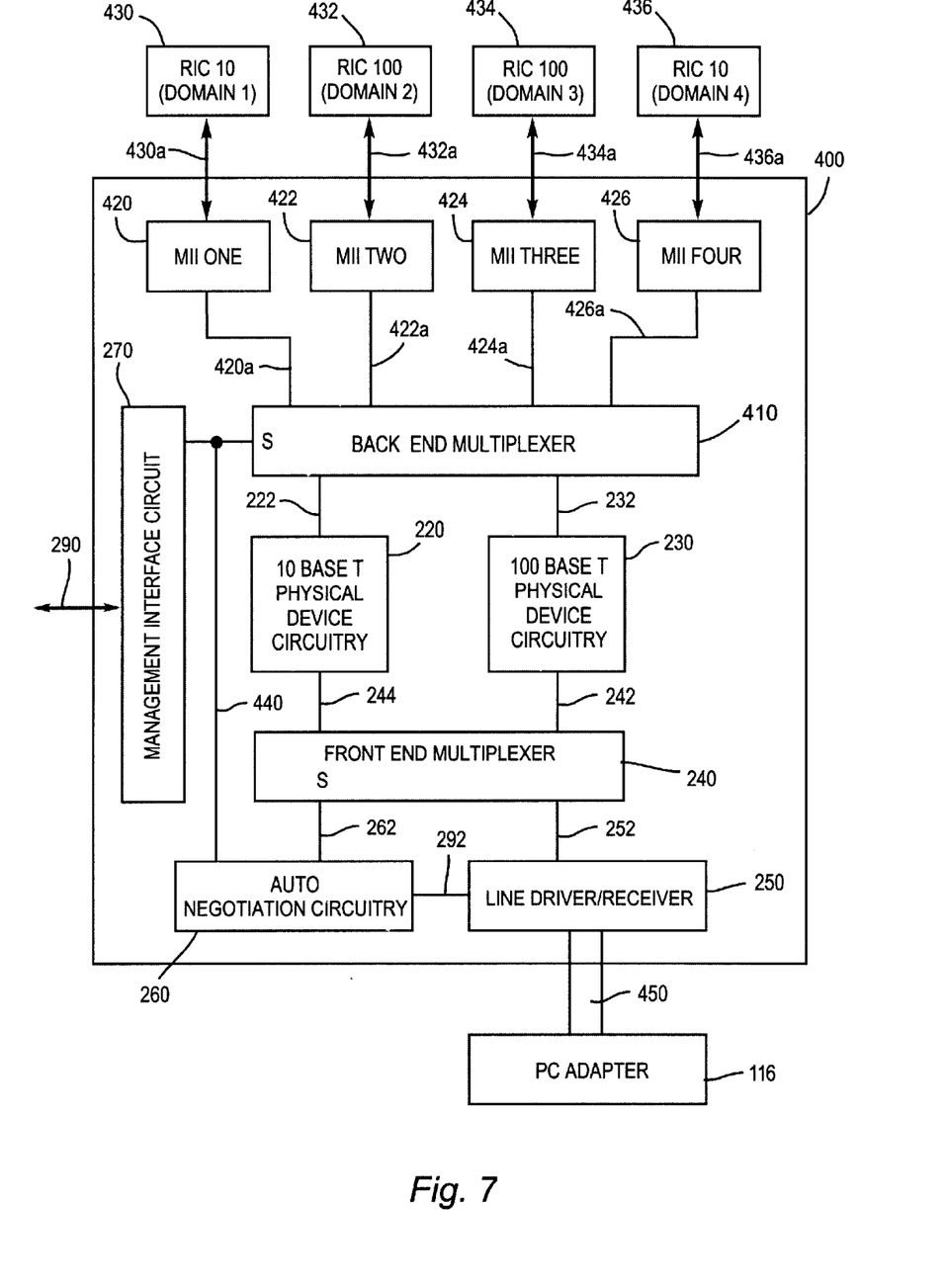
FIG. 7 is a switching physical device in accordance with the present invention including a controlled back end multiplexer for channeling information to one of multiple MII interface connections (e.g., four) within a 10/100 repeater hub.

FIG. 7 illustrates a 10/100 physical device 400 ("physical device 400") implemented in accordance with the present invention that provides switching between as many as four different collision domains 430,432,434 and 436. Physical device 400 is preferably implemented on a single chip. Physical device 400 includes the analogous line driver/ receiver circuit 250, auto-negotiation circuit 260, front end multiplexer 240, management interface circuit 270, 10 Base T physical device circuit 220 and 100 Base T physical device circuit 230 as the physical device 200 of FIG. 5. However, the physical device 400 of FIG. 7 includes a back end multiplexer 410 that channels bus 222 or bus 232 over one of four different Mll interfaces 420, 422, 424 and 426. Specifically, the back end multiplexer 410 is coupled to buses 222 and 232 on one side and also coupled to buses 420a, 422a, 424a and 426a on the other side. Buses 420a, 422a, 424a and 426a are coupled, respectively, to Mll one 420, MII two 422, MII three 424 and MII four 426. Mll one 420 communicates within domain 1 430 and in one example is coupled to a 10 M RIC. MII two 422 communicates within domain 2 432 and in one example is coupled to a 100 M RIC. MII three 424 communicates within domain 3 434 and in one example is coupled to a 100 M RIC. Lastly, MII four 426 communicates within domain 4 436 and in one example is coupled to a 10M RIC.

It is appreciated that the select input of the back end multiplexer 410 is controlled by a two bit control bus 440. Control bus 440 carries a combination of signals from auto-negotiation circuit 260 and from the management interface circuit 270.

In the absence of an external control signal from interface 290, physical device circuit 400 operates as follows. When auto-negotiation circuit 260 determines that the connected adapter 116 is capable of 100 M operation (using well known procedures), a first signal over control bus 262 causes front end multiplexer 240 to couple bus 252 and bus 242. Further, a first or second control signal is also forwarded to the select input of the back end multiplexer 410 to couple bus 232 to either bus 422a or 424a, depending on a configuration bit set in the management interface circuit 270. In this case, either the MII two interface 422 is selected or the MII three interface 424 is selected, both of which are associated with domains that operate at 100 M. Likewise, when auto-negotiation circuit 260 determines that the connected adapter 116 is not capable of 100 M operation (using well known procedures), a second signal over control bus 262 causes front end multiplexer 240 to couple bus 252 and bus 244. Further, a third or fourth control signal is also forwarded to the select input of the back end multiplexer 410 to couple bus 222 to either bus 420a or 426a, depending on the configuration bit set in the management interface circuit 270. In this case, either the MI1 one interface 420 is selected or the MI1 four interface 426 is selected, both of which are associated with domains that operate at 10 M.

With reference to physical device circuit 400 of FIG. 4, like physical device 200, the result of the auto-negotiation circuit 260 can be overridden by an external override signal from external SMI 290. The SMI 290 originates from a remote network management protocol which can force the physical device 400 to use the 10 Base T physical device circuit 220 or force physical device 200 to use the 100 Base T physical device circuit 230. In addition, the external control signal can force back end multiplexer 410 to select MI1 one 420, can force back end multiplexer 410 to select MII two 422, can force back end multiplexer 410 to select MII three 424, or can force back end multiplexer 410 to select MII four 426. It is appreciated that when the external control signal is not present, multiplexers 240 and 410 are controlled by the result of the auto-negotiation circuit 260 plus power-on defaults that determine a default MII interface.

In accordance with the present invention, by providing (1) four MII interfaces 420, 422, 424 and 426, (2) the back end multiplexer 410 and (3) the control signal originating from the auto-negotiation circuit 260, the present invention allows physical device 400 to automatically configure (or "switch") a single port to operate at a particular communication rate between two possible rates (e.g., 10 M or 100 M) and also to communicate within a particular collision domain between four possible domains that are all accessible to the port (e.g., domain 1, domain 2, domain 3 and domain 4). Furthermore, the switching functionality of the physical device 400 can be controlled by auto-negotiation circuit 260 providing seamless switching between multiple 100 M and 10 M domains.

Figure 9A:
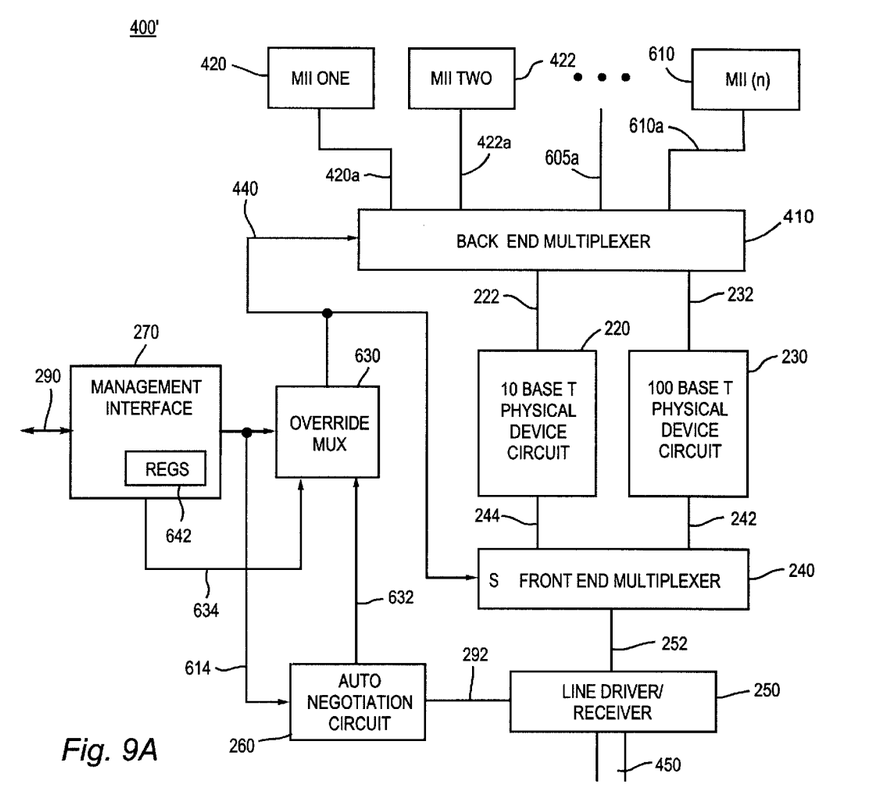
FIG. 9A is a block diagram illustrating a particular embodiment of the present invention for controlling the back end multiplexer of the present invention including one control line from the auto-negotiation circuit and a manual override signal originating from a system management interface.

It is appreciated that although the above two embodiments of the present invention physical device 200 and 400 are illustrated herein, the present invention can be implemented with other numbers of MII interfaces in addition to two and four. For instance, as shown in FIG. 9A, three, five, six, seven, etc., MII interfaces can be implemented within each physical device of the present invention. Further, the physical device of the present invention can be implemented to operate with different communication protocols in addition to the 10 Base T circuit 220 and the 100 Base T circuit 230 within the scope of the present invention.

Quad-Physical Device Configurations

Figure 8A:
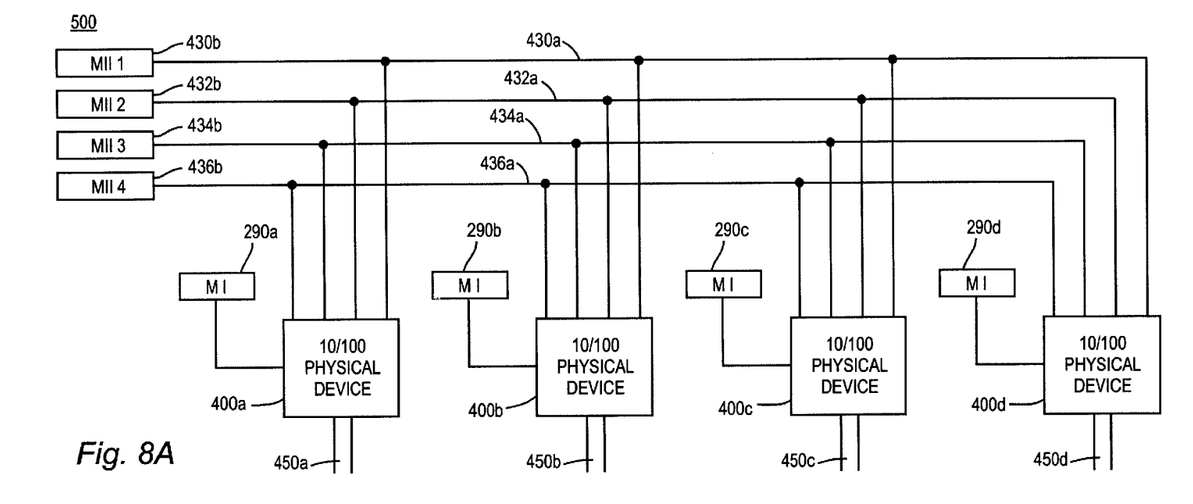
FIG. 8A is a block diagram of a quad physical device (quad-phy) for four ports and having four domains and implemented on a single chip

FIG. 8A illustrates a single circuit 500 in accordance with the present invention that employs four 10/100 physical devices of the type described in FIG. 7 on a single chip. This circuit 500 is called the quad-phy design and each is capable of implementing four ports. Each quad-phy circuit 500 allows four ports to be independently switched between 10 M and 100 M communication speed and also allows the four ports to be independently switched between four collision domains. Specifically, four physical devices 400a–400d are provided and are coupled respectively to connections 450a–450d (e.g., twisted pair wire or fiber). Each connection is coupled to a respective adapter (not shown). A management interface 290a, 290b, 290c, 290d is coupled to each respective physical device 400a–400d.

Common bus 430a is coupled from the MII one 430 of each physical device 400a–400d and brought as an output 430b for coupling to a first RIC of a repeater hub. Common bus 432a is coupled from the MII two 432 of each physical device 400a–400d and brought as an output 432b for coupling to a second RIC of a repeater hub. Common bus 434a is coupled from the MII three 434 of each physical device 400a–400d and brought as an output 434b for coupling to a third RIC of a repeater hub. Lastly, common bus 436a is coupled from the MII four 436 of each physical device 400a–400d and brought as an output 436b for coupling to a fourth RIC of a repeater hub. Multiple serially chained quad-phy devices 500 can be used within a repeater hub to provide multiple port circuitry. For instance, a 16 port repeater hub uses four quad-phy devices 500. It is appreciated that the circuit 500 of FIG. 8A can also be modified within the scope of the present invention wherein a cross bar switch circuit an be interfaced between MII1–MII4 and the physical devices 400a–400d in lieu of he dedicated bus circuitry shown.

Figure 8B:
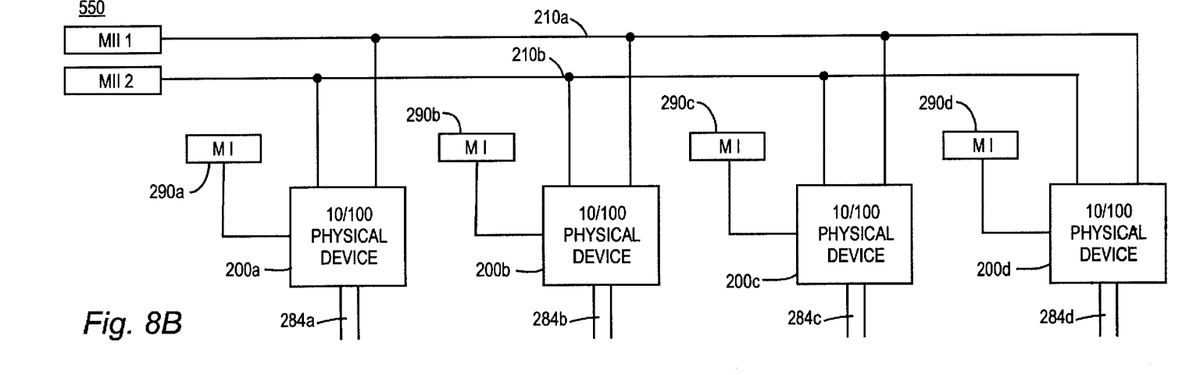
FIG. 8B is a block diagram of a quad physical device (quad-phy) for four ports and having two domains and implemented on a single chip

FIG. 8B illustrates another quad-phy circuit 550 that is a variation of the quad-phy circuit 500 (FIG. 8A) but implemented using four physical devices 200 of the type shown in FIG. 5. In this case, four ports can be realized per quad-phy device 550 and the ports can be independently switched between two collision domains as only MII one and MII two are supported. Like circuit 500, quad-phy circuit 550 is preferably implemented on a single chip. Multiple serially chained quad-phy devices 550 can be used within a repeater hub to provide multiple port circuitry. For instance, a 16 port repeater hub uses four quad-phy devices 550.

Switching Physical Device with Multiple (n) MII Connections

FIG. 9A illustrates a generic physical device 400' in accordance with the present invention in that is supports up to (n) collision domains and the back end multiplexer 410 is therefore coupled to n MII interfaces 420, 422, . . . 610. Physical device 400' illustrates the circuitry in more detail that generates the control signal for the back end multiplexer 410. Specifically, management interface circuit 270 generates an override control signal over line 614 and also generates override data signals over bus 634 when the override signal is active. The override control signal that is transmitted over line 614 controls the select input of override multiplexer circuit 630 and also the auto negotiation circuit 260. Line 614 is required to notify the auto negotiation circuit 260 of the forced mode to prevent it from incorrectly negotiating. Override multiplexer circuit 630 supplies control signals over bus 440 to select inputs which control both the front end multiplexer 240 and the back end multiplexer 410. Management interface circuit 270 generates override data signals over bus 634 which is coupled to an input of override multiplexer circuit 630. Override data signals originate from register 642. The result signal of line 632 from the auto-negotiation circuit 260 is also coupled to an input of override multiplexer circuit 630. A control register 642 pertinent to the port associated with the physical device 400' is stored in the management interface circuit 270.

When the override signal over line 614 is not active, the override multiplexer circuit 630 is configured such that the back end multiplexer 410 and the front end multiplexer 240 are controlled by the result signal from the auto-negotiation circuit 260 carried over line 632 and default values for multiplexer select lines 634. When the override signal over line 614 is active, the override multiplexer circuit 630 is configured such that the back end multiplexer 410 and the front end multiplexer 240 are controlled by the override data supplied over bus 634.

Figure 9B:
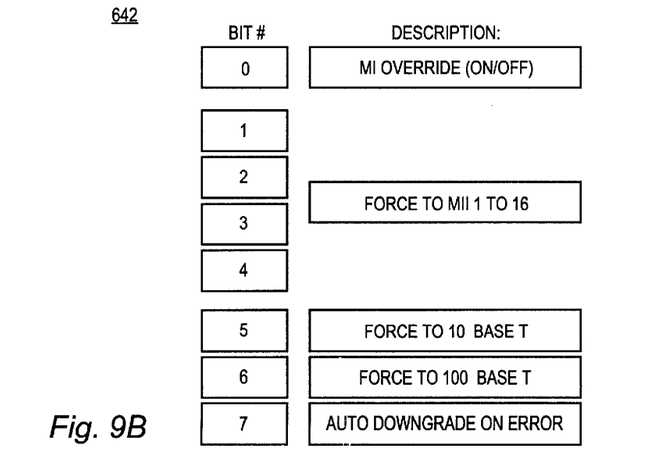
FIG. 9B is a diagram of one exemplary control register for controlling the manual overrides for a single port in accordance with the present invention.

FIG. 9B illustrates an exemplary bit assignment for the control register 642. The override control signal is represented as bit0 while the override data is represented by bit1-bit7. BitO indicates whether or not a management interface (MI) override is present. If bitO is zero, then the result of the auto-negotiation circuit 260 controls both the front end multiplexer 240 and the back end multiplexer 410. If bitO is one, then data within bit1-bit7 controls the front end multiplexer 240 and the back end multiplexer 410. Bit1-bit4 from register 642 form a four bit number that indicates which MII interface the physical device 400' is to use; up to 16 MII interfaces are supported by register 642. This four bit data is used to control the back end multiplexer 410 to select the proper MII interface. Bit5 of register 642 is used to control the front end multiplexer 240 and indicates that 10 Base T physical circuit 220 is to be used. Bit6 of register 642 is used to control the front end multiplexer 240 and indicates that 100 Base T physical circuit 230 is to be used.

Bit7 is optional and indicates whether or not automatic error downgrade mode is active. When active, provided the physical device 400' is operating at 100 M due to an auto-negotiation for that speed and provided further an excessive amount of communication errors are detected, then the physical device 400' automatically downgrades the communication rate to 10 M. If bit7 is not set then this automatic error downgrade is deactivated.

With reference to FIG. 9A, when bitO of register 642 is set, then a control signal is sent over line 644 and the control multiplexer 630 passes the control information from bus 634 over bus 440. Bus 634 carries the 4-bit data from bits 1–4 to control the back end multiplexer 410. When bitO of register 642 is not set, then a control signal is sent over line 644 and the control multiplexer 630 passes the control information from bus 632 over bus 440. When bitO is set, the auto-negotiation circuit 260 passes the control signal from bus 636 (e.g., bit5 or bit6) through to bus 650 to control the front end multiplexer. When bitO is not set, auto-negotiation circuit 260 controls bus 650 with the result of the auto-negotiation session, which is also passed over bus 632.

10/100 Repeater Hub with Switching Physical Devices

Figure 10:
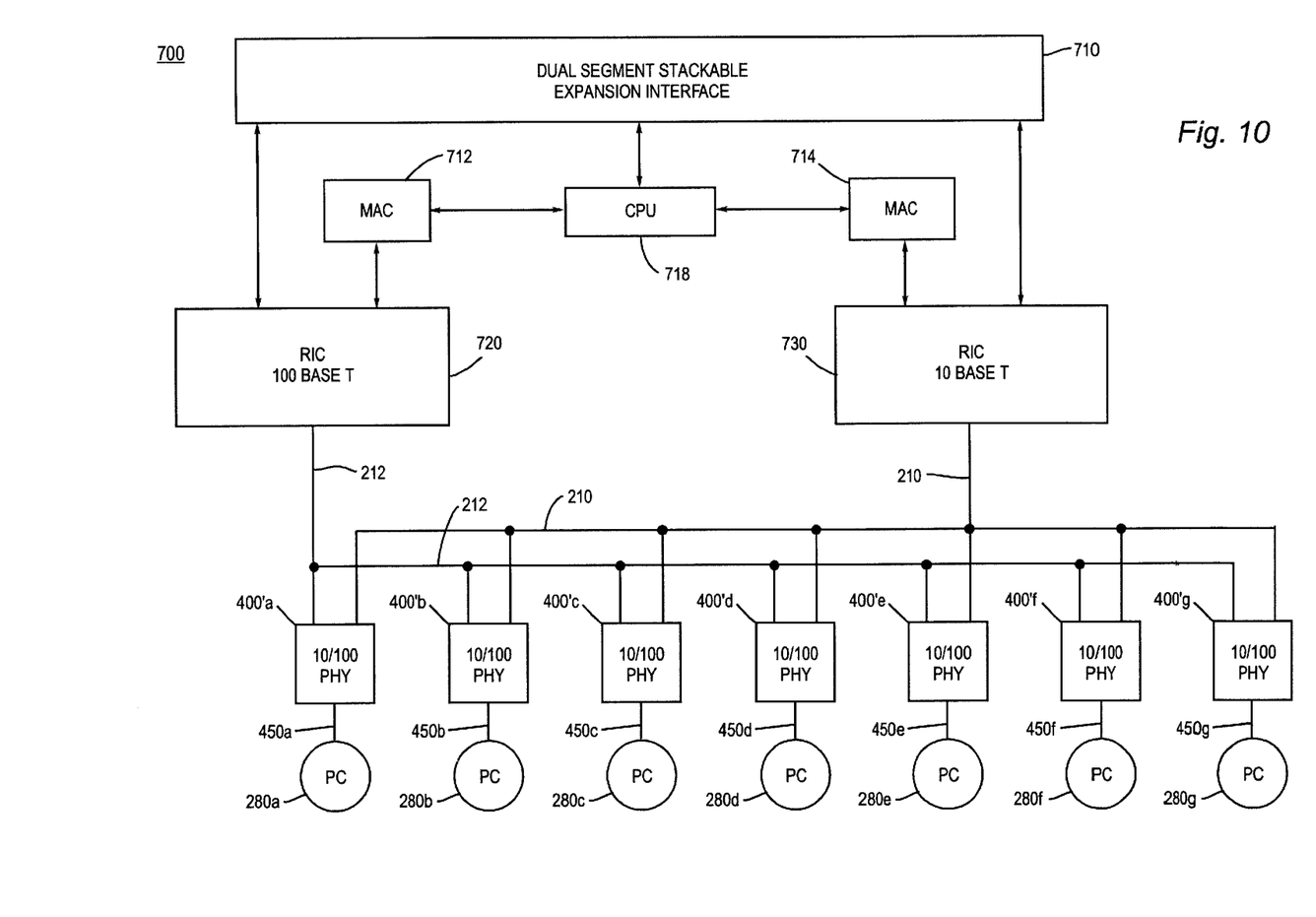
FIG. 10 is a block diagram of a 10/100 repeater hub implemented in accordance with the present invention and coupled to a number of networked computer systems.

FIG. 10 illustrates a stackable 10/100 repeater hub 700 implemented in accordance with the present invention. Repeater hub 700 includes a 100 Base T repeater interface controller (RIC) circuit 720 and also a 10 Base T RIC 730. RIC 720 maintains one collision domain at 100 M and RIC 730 maintains a second collision domain at 10 M. RIC 720 is coupled to a media access controller (MAC) circuit 712 which is coupled to a processor 718. The processor 718 is coupled to a backplane dual segment interface. RIC 730 is coupled to MAC circuit 714 which is coupled to processor 718. RIC 720 and RIC 730 are also independently coupled to the backplane dual segment interface. Unlike the prior art 10/100 repeater hubs that do not contain expensive and complex external segment switching circuitry, the individual ports of the 10/100 repeater hub 700 of the present invention are not hardwired to only one collision domain, but can be selectively configured to operate with either collision domain.

The 10/100 repeater hub 700 includes a number of physical devices 400'a–400'g that are implemented in accordance with FIG. 9A where the number of MII interfaces is two in this case. Alternatively, physical devices 400'a–400'g could also be implemented of the type illustrated in FIG. 5. In a second alternative, the physical devices 400'a–400'g can be implemented by serially chaining multiple quadphy circuits 550 as shown in FIG. 8B. The first MII interface of each physical device of 400'a–400'g is coupled to common bus 210 which is coupled to RIC 730 for domain 2. The second MII interface of each physical device of 400'a–400'g is coupled to common bus 212 which is coupled to RIC 720 for domain 1. Each physical device of 400'a–400'g is also coupled via a respective connection of 450a–450g to a respective adapters within computer systems 280a–280g. The connections 450a–450g can be twisted pair type, fiber, etc. It is appreciated that a management interface control input (not shown) is also coupled to each physical device of 400'a–400'g.

Each of the ports realized within the 10/100 repeater hub 700 of the present invention can be individual configured (e.g., by the auto-negotiation circuits or by external management control) to be in domain 1 or in domain 2 without requiring complex and expensive switching control circuits. The configuration can be externally controlled by a network administrator (via a control system) or automatically determined based on the auto-negotiation circuitry within each physical device. If a new user connects into a port of the 10/100 repeater hub 700, the hub 700 (via the physical device) automatically determines which domain the user should belong and the physical device automatically performs the domain switching and the communication speed switching that is required. Therefore, the present invention 10/100 repeater hub 700 provides a flexible mechanism for handling problems that occur when users move from one hub to another and upgrade to higher speeds from 10 mega bits per second. Further, the present invention repeater hub 700 provides a flexible mixed domain 10/100 Ethernet repeater hub in that individual ports can be assigned to one domain or another and this assignment or re-assignment can be automatic or by external control.

Figure 11:
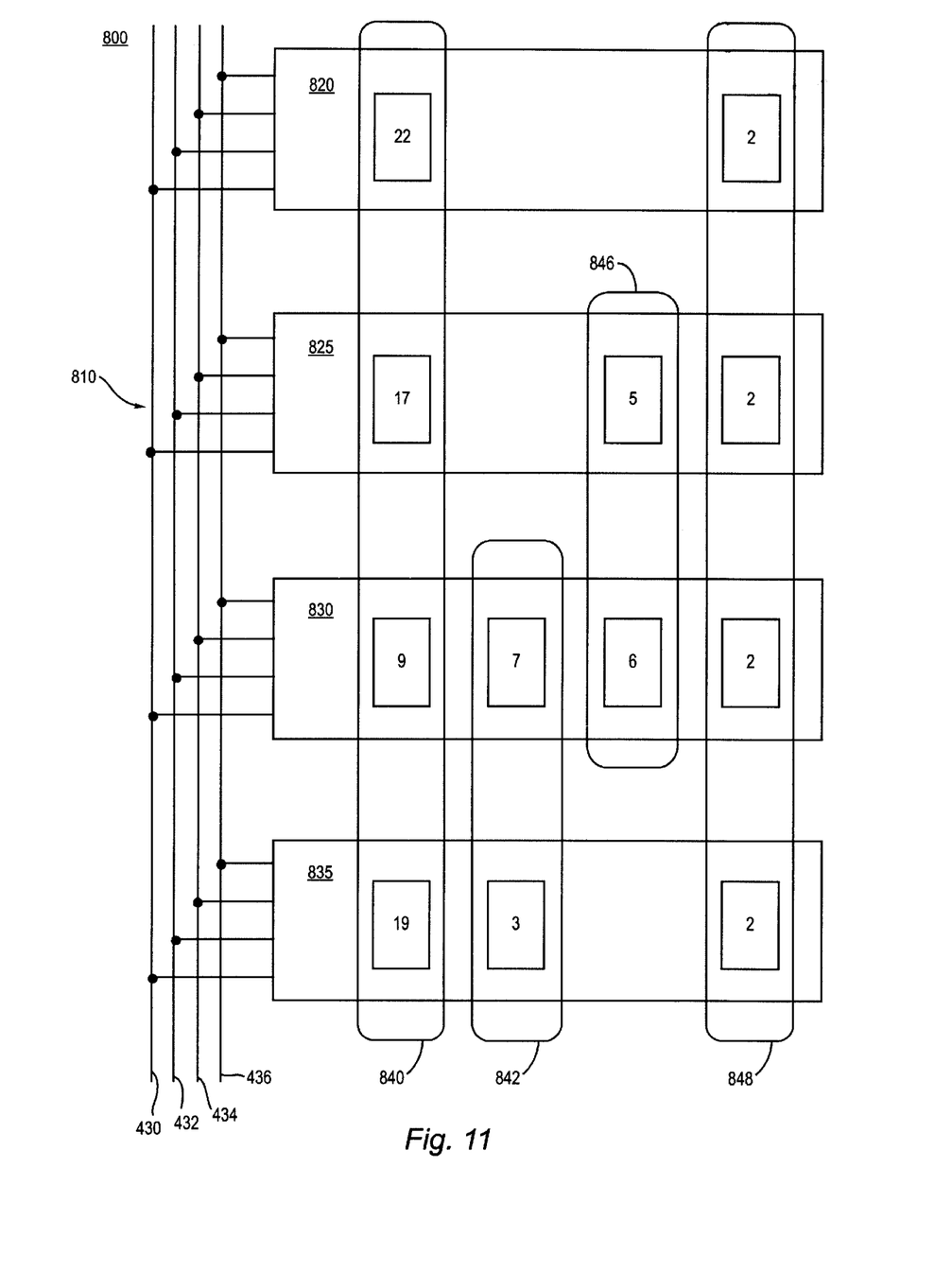
FIG. 11 illustrates an exemplary local area network of stackable 10/100 repeater hubs and also illustrates the flexible port assignments allowed by the repeater hubs of the present invention between four exemplary collision domains.

FIG. 11 illustrates a network 800 of four 10/100 repeater hubs 820, 825, 830, 835 implemented in accordance with the present invention. The repeater hubs of FIG. 11 are similar to the repeater hub 700 of FIG. 10 except physical devices of the type shown in FIG. 7 are used having four MII interfaces each. In this case, four domains are realized. Within this configuration 800 any port of any repeater can be assigned to any one of the four domains. FIG. 11 illustrates an exemplary configuration of ports using 24-port stackable 10/100 repeater hubs. The repeater hubs 820, 825, 830, 835 are coupled together using a 4–8 bus interface 810 that supplies at least four common busses 430, 432, 434 and 436, each bus supporting a separate collision domain. Within stackable repeater hub 820, 22 ports are configured in domain 840 and two ports are configured within domain 848. Within stackable repeater hub 825, 17 ports are configured in domain 840, 5 ports are configured in domain 846 and two ports are configured within domain 848. Within stackable repeater hub 830, 9 ports are configured in domain 840, 7 ports are configured in domain 842, 6 ports are configured in domain 846 and two ports are configured within domain 848. Within stackable repeater hub 835, 19 ports are configured in domain 840, 3 ports are configured in domain 842 and two ports are configured within domain 848. As discussed above the port domain assignment can be (1) automatic based on auto-negotiation; (2) manual based on a management interface control signal; or (3) a mixture of both because each physical device has its own control register 642 (FIG. 9A).

The preferred embodiment of the present invention, a multi-communication rate switching physical device for a mixed communication rate Ethernet repeater, is described. While the present invention has been described in particular embodiments, it should be appreciated that the present invention should not be construed as limited by such embodiments, but rather construed according to the below claims.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A switchable physical device circuit integrated on a semiconductor substrate for interfacing with an adapter of a computer system, said switchable physical device circuit comprising:
   a first physical device circuit operable at a first communication rate;
   a second physical device circuit operable at a second communication rate;
   a front end multiplexer controlled by a control signal and for multiplexing information between said adapter and one of said first and said second physical device circuits;
   a first and second bus; and
   a back end multiplexer controlled by said control signal and for multiplexing information between one of said first and said second physical device circuits and one of said first and said second buses;
   wherein said first bus is coupled to a first media independent interface circuit for communicating with a first collision domain and said second bus is coupled to a second media independent interface circuit for communicating with a second collision domain.

2. A switchable physical device circuit as described in claim 1 wherein said first physical device circuit is an Ethernet 10 Base T physical device circuit and wherein said first communication rate is 10 Megabits per second.

3. A switchable physical device circuit as described in claim 2 wherein said second physical device circuit is an Ethernet 100 Base T physical device circuit and wherein said second communication rate is 100 Megabits per second.

4. A switchable physical device circuit as described in claim 3 further comprising a third physical device circuit operable at a third communication rate, said third physical device circuit coupled to said front end multiplexer and coupled to said backend multiplexer.

5. A switchable physical device circuit as described in claim 1 wherein said first physical device circuit is an Ethernet 100 Base T physical device circuit and wherein said first communication rate is 100 Megabits per second and wherein said second physical device circuit is an Ethernet 1000 Base T physical device circuit and wherein said second communication rate is 1000 Megabits per second.

6. A switchable physical device circuit as described in claim 5 wherein said first bus is coupled to a first media independent interface circuit for communicating with a first collision domain and said second bus is coupled to a second media independent interface circuit for communicating with a second collision domain wherein one of said first and second media independent interface circuits is a gigabit media independent interface (GMII) circuit.

7. A switchable physical device circuit integrated on a semiconductor substrate for interfacing with an adapter of a computer system, said switchable physical device circuit comprising:
   a first physical device circuit operable at a first communication rate;
   a second physical device circuit operable at a second communication rate;
   a front end multiplexer controlled by a control signal and for multiplexing information between said adapter and one of said first and said second physical device circuits;
   a first and second bus;
   a back end multiplexer controlled by said control signal and for multiplexing information between one of said first and said second physical device circuits and one of said first and said second buses; and
   an auto-negotiation circuit for determining if said adapter is able to communicate at said second communication rate and for generating a result signal indicative thereof wherein said result signal is also said control signal.

8. A switchable physical device circuit as described in claim 7 further comprising an interface circuit coupled to receive external signals, said interface circuit for generating an override signal bypassing said result signal and controlling said front end and back end multiplexers.

9. A switchable physical device circuit as described in claim 7 further comprising a line driver/receiver circuit coupled to said auto-negotiation circuit and coupled to receive and transmit signals over a twisted pair connection coupled to said adapter.

10. A switchable physical device circuit as described in claim 7 further comprising a line driver/receiver circuit coupled to said auto-negotiation circuit and coupled to receive and transmit signals over a fiber connection coupled to said adapter.

11. A switchable physical device circuit integrated on a semiconductor substrate for interfacing with an adapter of a computer system, said switchable physical device circuit comprising:
   a first physical device circuit operable at a first communication rate;
   a second physical device circuit operable at a second communication rate;
   an auto-negotiation circuit for determining if said adapter is able to communicate at said second communication rate and generating a result signal indicative thereof;
   an override circuit for supplying control signals by switching between said result signal and override signals, said override circuit controlled by an override control signal;
   a front end multiplexer controlled by said control signals and for multiplexing information between said adapter and one of said first and said second physical device circuits;

a first and second bus; and a back end multiplexer controlled by said control signals and for multiplexing information between one of said first and said second physical device circuits and one of said first and second buses.

12. A switchable physical device circuit as described in claim 11 wherein said first bus is coupled to a first media independent interface circuit for communicating with a first collision domain and said second bus is coupled to a second media independent interface circuit for communicating with a second collision domain.

13. A switchable physical device circuit as described in claim 11 further comprising a register and wherein said override circuit is a multiplexer and wherein said override data signals and override control signal originate from said register.

14. A switchable physical device circuit as described in claim 11 wherein said first physical device is an Ethernet 10 Base T physical device circuit and wherein said first communication rate is 10 megabits per second.

15. A switchable physical device circuit as described in claim 14 wherein said second physical device is an Ethernet 100 Base T physical device circuit and wherein said second communication rate is 100 Megabits per second.

16. A switchable physical device circuit as described in claim 11 further comprising a line driver/receiver circuit coupled to said auto-negotiation circuit and coupled to receive and transmit signals over a twisted pair connection coupled to said adapter.

17. A switchable physical device circuit as described in claim 11 further comprising a line driver/receiver circuit coupled to said auto-negotiation circuit and coupled to receive and transmit signals over a fiber connection coupled to said adapter.

18. A switchable physical device circuit as described in claim 11 wherein said first physical device is an Ethernet 100 Base T physical device and wherein said first communication rate is 100 Megabits per second and wherein said second physical device circuit is an Ethernet 1000 Base T physical device circuit and wherein said second communication rate is 1000 Megabits per second.

19. A switchable physical device circuit as described in claim 18 wherein said first bus is coupled to a first media independent interface circuit for communicating with a first collision domain and said second bus is coupled to a second media independent interface circuit for communicating with a second collision domain wherein one of said first and second media independent interface circuits is a gigabit media independent interface (GMII) circuit.

20. A repeater hub for an Ethernet communication network, said repeater comprising:

a plurality of ports wherein each port is for receiving information from a respective adapter of a computer system and includes a switchable physical device circuit which comprises:

a first and second physical device circuit operable at a first and second communication rate, respectively;

a front end multiplexer controlled by a control signal and for multiplexing information between said adapter and one of said first and second physical device circuits;

a first media independent interface circuit coupled to communicate with a first collision domain;

a second media independent interface circuit coupled to communicate with a second collision domain; and a back end multiplexer controlled by said control signals and for multiplexing information between one of said first and said second physical device circuits and one of said first and second media independent interface circuits.

21. A repeater hub as described in claim 20 further comprising a first repeater interface controller circuit for establishing said first collision domain and a second repeater interface controller circuit for establishing said second collision domain.

22. A repeater hub as described in claim 20 wherein each switchable physical device circuit further comprises an auto-negotiation circuit for determining if said respective adapter is able to communicate at said second communication rate and for generating a result signal indicative thereof wherein said result signal is also said control signal.

23. A repeater hub as described in claim 22 wherein each switchable physical device circuit further comprises a line driver/receiver circuit coupled to said auto-negotiation circuit and coupled to receive and transmit signals over a twisted pair connection coupled to said respective adapter.

24. A repeater hub as described in claim 22 wherein each switchable physical device circuit further comprises a line driver/receiver circuit coupled to said auto-negotiation circuit and coupled to receive and transmit signals over a fiber connection coupled to said respective adapter.

25. A repeater hub as described in claim 22 wherein each switchable physical device circuit further comprises an override circuit for bypassing said result signal with override data signals when an override control signal is present.

26. A repeater hub as described in claim 20 wherein said first physical device is an Ethernet 10 Base T physical device circuit and wherein said first communication rate is 10 megabits per second.

27. A repeater hub as described in claim 26 wherein said second physical device is an Ethernet 100 Base T physical device circuit and wherein said second communication rate is 100 Megabits per second.

28. A repeater hub as described in claim 20 wherein one of said first and second media independent interface circuits is a gigabit media independent interface (GMII) circuit and wherein said first physical device is an Ethernet 100 Base T physical device and wherein said first communication rate is 100 Megabits per second and wherein said second physical device circuit is an Ethernet 1000 Base T physical device circuit and wherein said second communication rate is 1000 Megabits per second.

\* \* \* \* \*